(12) United States Patent
Schaffer et al.

(10) Patent No.: US 8,817,974 B2
(45) Date of Patent: Aug. 26, 2014

(54) FINITE FIELD CRYPTOGRAPHIC ARITHMETIC RESISTANT TO FAULT ATTACKS

(75) Inventors: Martin Schaffer, Gratkorn (AT); Bruce Murray, Hamburg (DE)

(73) Assignee: NXP B.V., Eindhoven (NL)

( * ) Notice: Subject to any disclaimer, the term of this patent is extended or adjusted under 35 U.S.C. 154(b) by 196 days.

(21) Appl. No.: 13/105,044

(22) Filed: May 11, 2011

(65) Prior Publication Data

US 2012/0288086 A1    Nov. 15, 2012

(51) Int. Cl.
*H04L 29/06*      (2006.01)
*G06F 7/72*      (2006.01)

(52) U.S. Cl.
CPC ........ *G06F 7/724* (2013.01); *G06F 2207/7271* (2013.01)
USPC .......................................................... 380/28

(58) Field of Classification Search
CPC ............................... G06F 7/724; H04L 9/004
USPC .......................................................... 380/28
See application file for complete search history.

(56) References Cited

U.S. PATENT DOCUMENTS

| | | | | |
|---|---|---|---|---|
| 5,991,415 | A * | 11/1999 | Shamir | ........................ 380/30 |
| 6,144,704 | A | 11/2000 | Startup et al. | |
| 8,369,517 | B2 * | 2/2013 | Venelli et al. | ................... 380/30 |
| 2005/0175174 | A1 * | 8/2005 | Kahl | .............................. 380/28 |
| 2006/0028249 | A1 | 2/2006 | Takahashi et al. | |
| 2009/0034720 | A1 | 2/2009 | Baek et al. | |
| 2009/0097637 | A1 * | 4/2009 | Boscher et al. | .................. 380/28 |
| 2010/0232599 | A1 * | 9/2010 | Joye | ............................... 380/28 |

FOREIGN PATENT DOCUMENTS

| | | |
|---|---|---|
| WO | 98/52319 A1 | 11/1998 |
| WO | 02/058321 A1 | 7/2002 |

OTHER PUBLICATIONS

Robert Wisbauer, Foundations of Module and Ring Theory, 1991, Gordon and Breach Science Publishers, pp. 1-616.*
Rivest, R.L., et al.; "A Method for Obtaining Digital Signatures and Public-Key Cryptosystems"; Communications of the ACM, vol. 21, No. 2; pp. 120-126 (Feb. 1978).
ElGamal, T.; "A Public Key Cryptosystem and Signature Scheme Based on Discrete Logarithms"; Advances in Cryptology—Crypto'84, vol. 196 of Lecture Notes in Computer Science; Springer; 9 pages (1985).
Feldman, P.; "A Practical Scheme for Non-Interactive Verifiable Secret Sharing"; IEEE Symposium on Foundations of Computer Science; IEEE Press.; pp. 427-437 (1987).
Feige, Uriel., et al.; "Zero Knowledge Proofs of Identify"; Extended Abstract; ACM; 8 pages (1987).
Schnoor, C.P.; "Efficient Identification and Signatures for Smart Cards"; Advances in Cryptology—Crypto'89; vol. 435, Lecture Notes in Computer Science; Springer; pp. 239-252 (1989).

(Continued)

*Primary Examiner* — Hadi Armouche
*Assistant Examiner* — Dao Ho

(57) ABSTRACT

Various embodiments relate to a method for integrity protected calculation of a cryptographic function including: performing an operation $c = a \circ b$ in a cryptographic function $f(x_1, x_2, \ldots, x_n)$ defined over a commutative ring R; choosing a' and b' corresponding to a and b such that a' and b' are elements of a commutative ring R'; computing $c' = a' \circ' b'$; computing $a'' = CRT(a, a')$ and $b'' = CRT(b, b')$, where CRT is the Chinese Remainder Theorem; computing $c'' = a'' \circ'' b''$; mapping c'' into R'; and determining if the mapping of c'' into R' equals c'.

10 Claims, 2 Drawing Sheets

(56) References Cited

OTHER PUBLICATIONS

Pedersen, T.P.; A Threshold Cryptosystem Without a Trusted Party (Extended Abstract); Advances in Cryptology—Eurocrypt'91; vol. 547, Lecture Notes in Computer Science; Springer; pp. 522-526 (1991).

Boneh, Dan, et al.; "On the Importance of Eliminating Errors in Cryptographic Computations"; Expanded Version of earlier paper that appeared in Eurocrypt'97 [7]; 17 pages (1997).

Itoh, T., et al.; "A Fast Algorithm for Computing Multiplicative Inverses in GF(2m) Using Normal Bases"; Information and Computation 78; pp. 171-177 (1998).

Cramer, R., et al. "A Practical Public Key Cryptosystem Provably Secure Against Adaptive Chosen Ciphertext Attack"; Advances in Cryptology—Crypto'98, vol. 1462 of Lecture Notes in Computer Science; Springer; 18 pages (May 1998).

Gennaro, R., et al.; "Simplified VSS and Fast-Track Multiparty Computations with Applications to Threshold Cryptography"; Proceedings of the 17$^{th}$ Annual ACM Symp. on Principles of Distributed Computing—PODC'98; ACM Pres; 11 pages (1998).

Lopez, Julio, et al.; "Fast Multiplication on Elliptic Curves over GF(2m) Without Precomputation"; CHES'99: Proceedings of the 1$^{st}$ Intl. Workshop on Cryptographic Hardware and Embedded Systems; London, UK; Springer-Verlag; pp. 316-327 (1999).

Paillier, P.; "Public-Key Cryptosystems Based on Composite Degree Residuosity Classes"; Advances in Cryptology—Eurocrypt'99, vol. 1592 Lecture Notes in Computer Science; Springer; pp. 223-238 (1999).

"Digital Signature Standard (DSS)"; Federal Information Processing Standards Publication; 76 pages (Jan. 2000).

Camenisch, J., et al.; "An Efficient System for Non-transferable Anonymous Credentials with Optional Anonymity Revocation"; Extended version of what is to appear in Advances in Cryptology—Eurocrypt 2001; 26 pages (2001).

Guajardo, J., et al.; "Itoh-Tsujii Inversion in Standard Basis and Its Application in Cryptography and Codes"; Design, Codes and Cryptography, 25(2); pp. 207-216 (Feb. 2002).

Gaubatz, Gunnar, et al.; Robust Finite Field Arithmetic for Fault-Tolerant Public-Key Cryptography; Fault Diagnosis and Tolerance in Cryptography; vol. 4236 of Lecture Notes in Computer Science; Springer Berlin/Heidelberg; 12 pages (2006).

Fouque, Pierre-Alain, et al.; "Fault Attack on Elliptic Curve Montgomery Ladder Implementation"; FDTC'08: Proceedings fo the 2008 5$^{th}$ Workshop on Fault Diagnosis and Tolerance in Cryptography; IEEE Computer Society; Washington D.C. USA; 6 pages (2008).

Dominguez-Oviedo, Agustin, et al.; "Fault-Based Attack on Montgomery's Ladder ECSM Algorithm"; Technical Report; Dept. of Mechatronics ITESM Campus Queretaro, Mexico; Dept. of Elec and Comp Engineering Univ. of Waterloo, Canada; Qualcomm Inc., San Diego, CA, US; 35 pages (2009).

Murray, B. et al., Finite Field Arithmetic resistant against Fault Attacks with Application to Elliptic Curve Cryptography and RSA, Jan. 24, 2011.

\* cited by examiner

FINITE FIELD CRYPTOGRAPHIC ARITHMETIC RESISTANT TO FAULT ATTACKS

TECHNICAL FIELD

Various exemplary embodiments disclosed herein relate generally to cryptographic arithmetic methods and systems resistant to fault attacks.

BACKGROUND

Cryptographic systems perform various arithmetic calculations. While many asymmetric cryptosystems are known to be provably secure with respect to mathematical assumptions, such cryptosystems may be vulnerable to implementation attacks such as fault attacks.

SUMMARY

Provided are embodiments that enable a cryptographic arithmetic method and system that is resistant to fault attacks.

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may also relate to a method for integrity protected calculation of a cryptographic function including: performing an operation $c = a \circ b$ in a cryptographic function $f(x_1, x_2, \ldots, x_n)$ defined over a commutative ring R; choosing a' and b' corresponding to a and b such that a' and b' are elements of a commutative ring R'; computing $c' = a' \circ' b'$; computing $a'' = CRT(a, a')$ and $b'' = CRT(b, b')$, where CRT is the Chinese Remainder Theorem; computing $c'' = a'' \circ'' b''$; mapping c'' into R'; and determining if the mapping of c'' into R' equals c'.

Various embodiments may also relate to a machine-readable storage medium encoded with instructions for performing an integrity protected calculation of a cryptographic function comprising: instructions for performing an operation $c = a \circ b$ in a cryptographic function $f(x_1, x_2, \ldots, x_n)$ defined over a commutative ring R; instructions for choosing a' and b' corresponding to a and b such that a' and b' are elements of a commutative ring R'; instructions for computing $c' = a' \circ' b'$; instructions for computing $a'' = CRT(a, a')$ and $b'' = CRT(b, b')$, where CRT is the Chinese Remainder Theorem; instructions for performing $c'' = a'' \circ'' b''$; mapping c'' into R'; and instructions for determining if the mapping of c'' into R' equals c'.

BRIEF DESCRIPTION OF THE DRAWINGS

In order to better understand various exemplary embodiments, reference is made to the accompanying drawings wherein.

DETAILED DESCRIPTION

Figure 1:
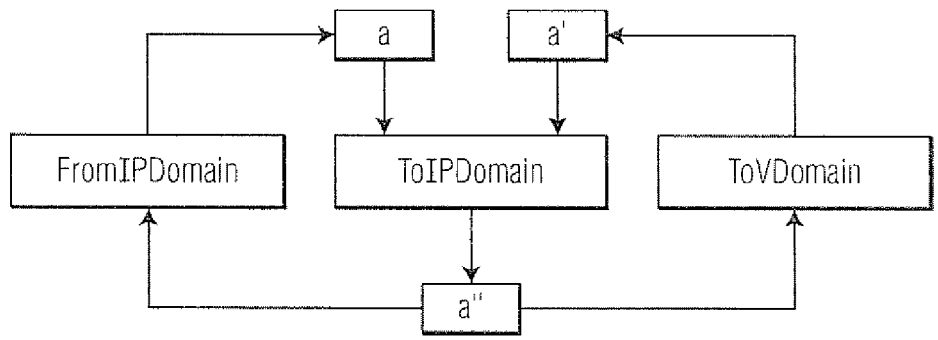
FIG. 1 illustrates the relationship of the functions for mapping elements between the various domains R, R', and R''.

Referring now to the drawings, in which like numerals refer to like components or steps, there are disclosed broad aspects of various exemplary embodiments.

Many asymmetric cryptosystems are known to be provably secure with respect to certain mathematical assumptions. Unfortunately, many straightforward implementations of such cryptosystems often become vulnerable against implementation attacks, especially on power-limited devices. One type of attack that may be of interest is fault attacks.

A fault attack may inject faults into the cryptographic processing. The fault attack may inject faults into memories (e.g., RAM, registers, EEPROM) used by an algorithm or may even inject faults into entire operations (e.g., the Arithmetical Logical Unit) with the goal to extract secret information given a collection of correct and incorrect results. Fault attacks may also be combined with other types of attack such as a side-channel attack.

Therefore, there is a need for efficient countermeasures against fault attacks, especially in asymmetric cryptography using Finite Field Arithmetic (or more relaxed Ring Arithmetic) as a building block. Two widely used families of cryptosystems using such a building block include: 1) cryptosystems based on the Factoring Problem, i.e., doing operations over the Ring $Z_n$, where n is the product of two or more primes, such as the RSA-cryptosystem or the Paillier-cryptosystem; and 2) cryptosystems based on the Discrete Logarithm (DL) Problem, where operations are done over a Group $G_n$ of order n, such as the ElGamal-cryptosystem, the Cramer-Shoup cryptosystem, the Digital Signature Algorithm, or the Schnorr signature scheme. $G_n$ can be, for instance, a multiplicative group $Z_p^*$ of the field $Z_p$, where p is a prime and hence $n = p-1$, or an Elliptic Curve Group of order n over a prime field or a binary extension field.

More advanced cryptographic techniques include schemes such as DL-based zero-knowledge proofs of knowledge (e.g., used for credential systems), DL-based verifiable secret sharing (e.g., used for access control to bank vaults or launching of nuclear missiles), DL-based secure multi-party computation (e.g., used to secure evaluate functions shared over several instances) or threshold cryptosystems (e.g., used to shared decryption or signature generation over a set of instances).

Notation

By $G_n$ we denote a group of order n. By ord(R) we denote the order of the multiplicative group of the ring R.

Chinese Remainder Theorem

In the following, the Chinese Remainder Theorem (CRT) is discussed in a simplified form, i.e., for moduli being the product of two distinct primes (or two distinct irreducible polynomials if CRT is considered for polynomial rings).

Let $n = pq$, where p and q are primes. Then for given $x_q \in Z_q$ and $x_p \in Z_p$ there exists a unique solution $x_n \in Z_n$ such that $x_n \equiv x_p$ (MOD p) and $x_n \equiv x_q$ (MOD q). Given $\bar{p}$ and $\bar{q}$, such that $$\bar{p}p \equiv 1 (\text{MOD } q) \text{ and } \bar{q}q \equiv 1 (\text{MOD } p), \quad (1)$$

one can compute $$x_n = (x_p \bar{q}q + x_q \bar{p}p) \text{MOD } n \quad (2)$$

having $$x_n \text{MOD} p \stackrel{(2)}{=} (x_p \bar{q}q + x_q \bar{p}p) \text{MOD} p \stackrel{(1)}{=} (x_p + x_q \bar{p}p) \text{MOD} p = x_p \quad (3)$$

and $$x_n \text{MOD} q \stackrel{(2)}{=} (x_p \bar{q}q + x_q \bar{p}p) \text{MOD} q \stackrel{(1)}{=} (x_p \bar{q}q + x_q) \text{MOD} q = x_q \quad (4)$$

Analogously, the CRT works for $R=Z_2[X]/(N(X))$, where $N(X)$ is the reduction polynomial being the product of two irreducible polynomials $Q(X)$ and $P(X)$. Henceforth, let $CRT_{p,q}(a,b) = (a\,\bar{p}\,p + b\,\bar{q}\,q) \text{ MOD } pq$.

Factoring Problem

Given two primes p and q it is possible to efficiently compute the product n=pq. This may be done in polynomial time. However, given any n the best known algorithms to find the according factorization run in sub-exponential time. This is known as the Factoring Problem. Note that the practical difficulty of solving this problem strongly depends on the choice of the lengths and types of the prime factors.

Discrete Logarithm Problem

Let, without loss of generality, $G_n$ be a multiplicative group of order n. Given $g \in G_n$ and an integer $k \in Z_n$, computing $y=g^k$ can be mounted in polynomial time (e.g., with square and multiply). However, given y, g, $G_n$ and n, the best known generic method of finding k has exponential running-time. This is known as the Discrete Logarithm Problem. Notice that the practical difficulty to solve this problem strongly depends on choice of $G_n$, g and n.

Fault Attacks

Let $G_n$ be an Elliptic Curve group and $P \in G_n$ a point of order n. The core operation of an Elliptic Curve cryptosystems is the scalar multiplication, i.e., given a secret integer $k \in Z_n$ computing Q=kP. Given P and Q finding $k \in Z_n$ is the Elliptic Curve Discrete Logarithm Problem.

Efficient Elliptic Curve Arithmetic using binary extension fields has been proposed and is very attractive for implementation on security ICs. However, this solution suffers from fault attacks in the following manner: one could modify the input point P of the scalar multiplication to a point P' which lies on the twist of the original curve, i.e., that is a curve with a different domain parameter $a_2$ (notice that $a_2$ is not used by the group operations). If the group defined over the twist includes several subgroups then the intractability of finding the scalar (i.e., solving the Discrete Logarithm Problem) lies in the complexity class of solving the Discrete Logarithm Problem in the largest subgroup. It has been shown that in that case only 1 of the NIST-recommended curves (namely K-283) has a twist curve with an order of same strength. Others, such as B-163, normally having a bit-security of approximately 80 bits, have only a bit-security of approximately 50 bits on their twist.

For example, it has also been shown that the Schnorr identification scheme can be broken with a few erroneous executions.

In the CRT-based RSA implementation, a message $M \in \{0,1\}^*$ may be signed in three steps:
1. $s_1 = H(M)^d$ MOD p
2. $s_2 = H(M)^d$ MOD q
3. $s = CRT_{p,q}(s_1, s_2)$ Thereby, $H:\{0,1\}^* \to Z_n$ is a cryptographic hash-function. The factorization of n may be found with a single successfully injected fault:
1. $s_1 = H(M)^d$ MOD p
2. $s_2' = H(M)^d$ MOD q $\Leftarrow$ fault injected, such that $s_2' \neq s_2$ (mod q)
3. $s' = CRT_{p,q}(s_1, s_2')$ Given now the correct signature s and the faulty one s', computing gcd(s−s',n) gives the prime factor p, thus the scheme may be broken, because the private key d may be computed efficiently. Other successful fault attacks for non-CRT based RSA have also been shown.

Therefore there remains a need to detect faults on a very low level, i.e., in the arithmetic layer where multiplications and additions may be performed over multi-precision integers or polynomials. The advantages of such a mechanism in such a low-level building block are that: 1) it may be applied to any cryptosystem which is based on that building block; 2) the computational overhead may be quite low; and 3) a fault may usually be detected earlier compared to mechanisms located on higher abstraction levels.

Let R be a commutative ring with 1 being the building block of a cryptosystem. For RSA that would be $R=Z_n$. For ElGamal over $Z_p^*$ it would be $R=Z_p$ where $Z_p^*$ is the multiplicative group of R. In case of Elliptic Curve cryptography $R=GF(q)$, where $q=p^n$, p prime. The goal is to detect faults in ring elements and operations over ring elements. Hence, the operations + and · need to be protected accordingly.

The idea is to define an integrity protected algebraic structure where each operation contains an integrity check. Therefore, let R' be a commutative ring with 1 (called the verification domain), such that one can define R' over R and R' with the help of the Chinese Remainder Theorem. Let $\circ' \in \{+', \cdot'\}$ be the operations in R' and $\circ'' \in \{+'', \cdot''\}$ in R'' analogous to + and · in R. For example, $R=Z_p$, $R'=Z_q$ and $R''=Z_{pq}$. We refer to R'' as the integrity-protected domain. The following functions are defined:

$$\text{ToIPDomain: } R \times R' \to R'' \quad (5)$$

ToIPDomain may be used to transfer an element of R to the integrity-protected domain R'' with the help of the Chinese Remainder Theorem.

$$\text{ToVDomain: } R'' \to R' \quad (6)$$

ToVDomain may be used to map an element of R'' back to R'. Notice an element of R' may be interpreted as some kind of checksum or cyclic redundancy check (CRC) over the element of R''.

$$\text{FromIPDomain: } R'' \to R \quad (7)$$

FromIPDomain is used to covert elements of R'' back to the original domain R.

FIG. 1 illustrates the relationship of the functions for mapping elements between the various domains R, R', and R''. An element a or a' may be mapped into element a'' using the function ToIPDomain. An element a'' may be mapped to a using the function FromIPDomain. An element a'' may be mapped to a' using the function ToVDomain. Furthermore, the mappings form a ring-homomorphism, i.e., for all $a,b \in R$, $a',b' \in R'$ the following invariants hold with respect to $\circ$, $\circ'$ and $\circ''$:

$$\text{ToVDomain}(\text{ToIPDomain}(a,a') \circ'' \text{ToIPDomain}(b,b')) = a' \circ' b' \quad (8)$$

$$\text{FromIPDomain}(\text{ToIPDomain}(a,a') \circ'' \text{ToIPDomain}(b,b')) = a \circ b \quad (9)$$

Now let $f(x_1, \ldots, x_n) = r$ be a formula defined over R that needs to be evaluated with the capability to detect faults on any operation or element involved. The following steps may be used to calculate $f(x_1, \ldots, x_n) = r$ and to detect faults:

Method A - Integrity Protected Calculation of f

A1:  input: $x_1, \ldots, x_n \in R$
A2:  output: $r = f(x_1,\ldots,x_n) \in R$ or r = invalid
A3:  Choose $x_i' \in R'$ (preferably at random) for $i = 1, \ldots, n$
A4:  Compute $x_i'' = \text{ToIPDomain}(x_i, x_i')$ for $i = 1, \ldots n$
A5:  for each operation of the form a ∘b in f do
A6:    Compute c" = a" ∘" b"
A7:    Compute c' = a' ∘' b'
A8:    if ToVDomain(c") = c' then
A9:      further calculate f
A10:   else
A11:     reject the calculation of f and return r = invalid
A12:   endif
A13: end for
A14: Return r = FromIPDomain(r").

Figure 2:
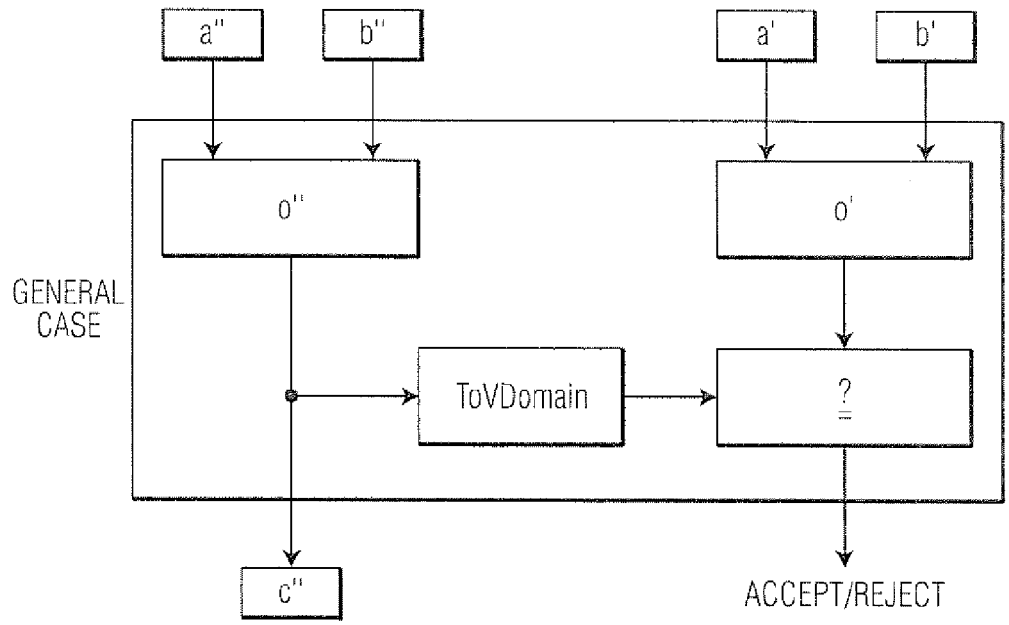
FIG. 2 is a flow diagram illustrating how one step of a cryptographic function $f$ may be calculated.

FIG. 2 is a flow diagram illustrating how a step of f may be calculated according to the method A.

If R is a Finite Field, one may want to also protect the multiplicative inversion as well. This may be possible straightforwardly with the method A if, for instance, Fermat's Little Theorem is used for inversion, i.e., inverting an element $a \in R$ is thereby done by setting $f(x) = x^{ord(R)-1}$.

Figure 3:
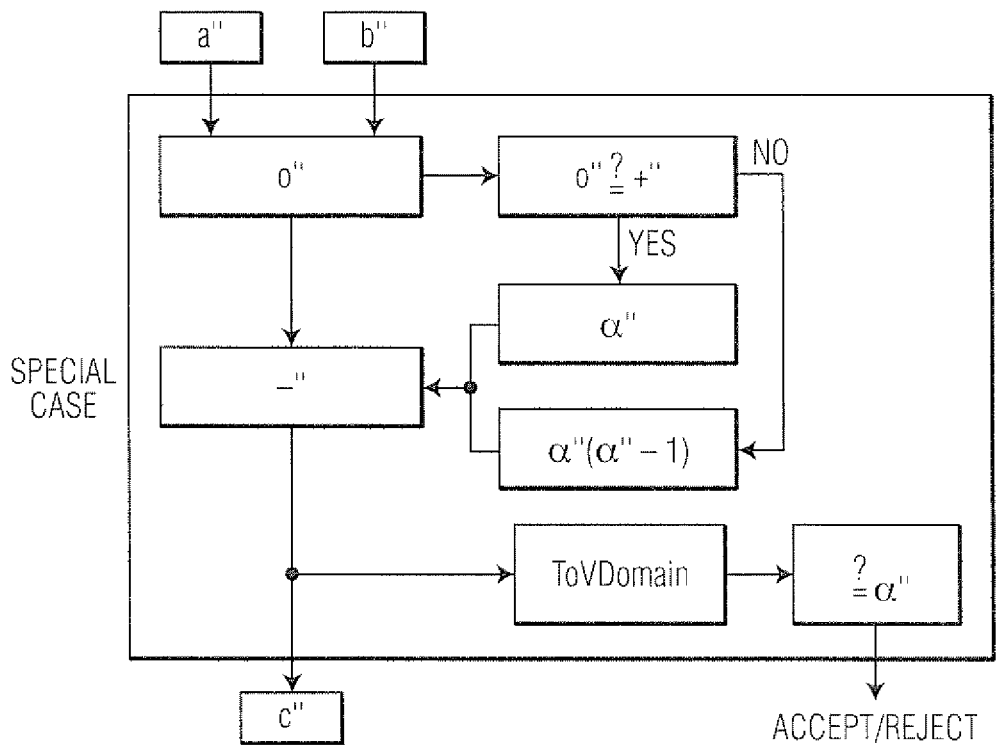
FIG. 3 is a flow diagram illustrating how one step of a cryptographic function $f$ may be efficiently calculated.

A second embodiment for calculating the cryptographic function $f$ may set $x_i' = \alpha'$ for all $x_i$, where $\alpha'$ is some constant in R'. This may result in a more efficient method for calculating the cryptographic function $f$. FIG. 3 is a flow diagram illustrating how the calculation of one step of $f$ would work for this other embodiment. As shown in FIG. 3, the special case needs a correction step for addition and multiplication as follows:

Addition: If two elements a",b"∈R" are added, the associated constant $\alpha'$ is doubled in hidden form. In that case $\alpha'$ needs to be subtracted in hidden form, but without affecting a+b. Therefore $\alpha'' = \text{ToIPDomain}(0,\alpha')$ is subtracted from a"+"b" before doing the consistency check.

Multiplication: If two elements a",b"∈R" are multiplied, the associated constant $\alpha'$ is squared in hidden form. In that case $\alpha'(\alpha'-1)$ needs to be subtracted in hidden form, getting $\alpha'^2 - \alpha'(\alpha'-1) = \alpha'^2 - \alpha'^2 + \alpha' = \alpha'$.

Therefore $\alpha''(\alpha''-1)$ may be subtracted from a"·"b" before doing the consistency check. If $\alpha'=1$ is selected for instance, i.e., the multiplicative neutral element in R', then the situation for multiplication may be trivial because a"(a"-1)=0, and thus no correction step is necessary.

In the second embodiment, the following steps may be used to calculate $f(x_1, \ldots, x_n) = r$ and to detect faults:

Method B - Efficient Integrity Protected Calculation of f

B1:  input: $x_1, \ldots, x_n \in R$
B2:  output: $r = f(x_1,\ldots,x_n) \in R$ or r = invalid
B3:  Compute $\alpha'' = \text{ToIPDomain}(0,\alpha')$, where $\alpha' \in R'$ is a constant
B4:  Compute $x_i'' = \text{ToIPDomain}(x_i, \alpha')$ for $i = 1, \ldots n$
B5:  for each operation of the form a ∘b in f do
B6:    Compute c" = a" ∘" b"-" $\tilde{\alpha}$, where $\tilde{\alpha} = \alpha''$ if ∘" = +" and $\tilde{\alpha} = \alpha''(\alpha''-1)$
    if ∘" = ·"
B7:    if ToVDomain(c") = $\alpha'$ then
B8:      further calculate f
B9:    else
B10:     reject the calculation of f and return r = invalid Method B - Efficient Integrity Protected Calculation of f B11:   endif
B12: end for
B13: Return r = FromIPDomain(r").

FIG. 3 is a flow diagram illustrating how f may be efficiently calculated.

Efficient Implementation

For the case that $R = Z_2[X]/(P(X))$, where $P(X)$ is an n-degree polynomial, a very efficient implementation may be implemented if the hardware provides a CRC co-processor. Let $R' = Z_2[X]/(Q(X))$, such that $Q(X)$ may be the generator polynomial implemented in hardware for the CRC co-processor. Thereby, let n be the bit-length of the polynomial $Q(X)$. Then, we have $R'' = Z_2[X]/(P(X)Q(X))$ with the CRT. Denote the CRC-function executed by the HW as CRC: $\{0,1\}^* \to Z_2[X]/(Q(X))$. Then, $$\text{ToIPDomain}(A(X), A'(X)) = (A(X)P(X)\overline{P(X)} + A'(X)Q(X) \overline{Q(X)}) \text{ MOD } P(X)Q(X) \quad (10)$$

$$\text{ToVDomain}(A(X)'') = \text{CRC}(A(X)'') = A(X)' \quad (11)$$

$$\text{FromIPDomain}(A(X)'') = A(X)'' \text{ MOD } P(X) = A(X) \quad (12)$$

Note that ToVDomain in this setting is very efficient and negligible in terms of computational costs compared to ToIPDomain and FromIPDomain.

Adding integrity protection may increase the amount of required resources in terms of time and space. However, when used for binary polynomial arithmetic, this overhead may be very small.

Let s be the number of words to store one element of R. Let t be the number of words to store one element of R'.

TABLE 1

Computational Costs for Montgomery Multiplication (Word-Level Algorithm)

| Size of t in machine words | · in R | · in R' | · in R" |
|---|---|---|---|
| L | $2s^2 + s$ | $L^2$ | $2s^2 + s + L(4s + 1) + 2L^2$ |
| 1 | $2s^2 + s$ | 1 | $2s^2 + 5s + 3$ |

Figure 4:
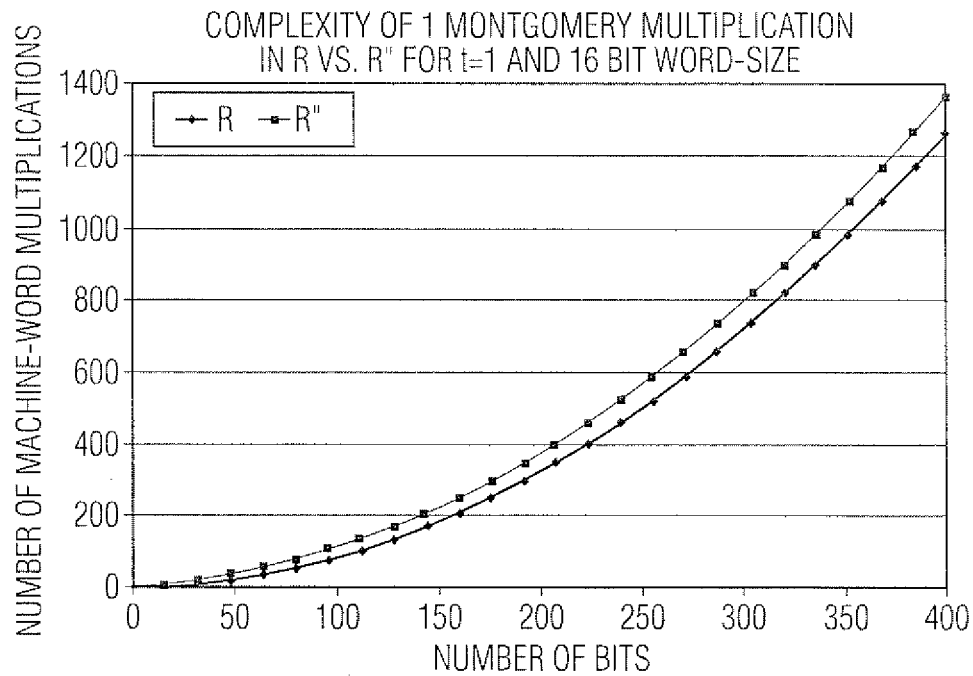
FIG. 4 illustrates the computational costs of using a Word-Level Montgomery Multiplication with and without integrity protection.

While the number of word-level multiplications grows with quadratic complexity for R, the overhead for integrity checking and hence the additional computations in R" only grows with linear complexity. Additionally, one execution of the CRC co-processor per operation may be necessary. However, this may be negligible compared to the costs of the multiplication. FIG. 4 illustrates the computational costs of using a Word-Level Montgomery Multiplication with and without integrity protection. Computation in R" requires only a small increase in computation versus computation in R.

On a power-limited device with word-size of 16 bits, it might be sufficient to spend 1 word for integrity-checking. For Elliptic Curves over binary fields typical bit-lengths used nowadays are 163 up to 233 bits, having s=11 and s=15. Doing multiplications in the integrity protected domain R' in this case would require around 15% more computational costs for s=11 and around 11% for s=15. Of course at the same time the detectability decreases as well. The corresponding trade-off depends on the application. Note that the aforementioned special case scenario gives no measurable advantage in terms of computational costs if a fast CRC co-processor is involved, but may save storage space because the integrity-values are not stored because there is only one constant value.

EXAMPLES

The following examples illustrate how the invention may be applied to a cryptosystem. Without loss of generality the general case is presented.

Elliptic Curve Cryptography Example

The scalar multiplication Q=kP is done as follows:
1. Convert each curve parameter of the domain parameters by using ToIPDomain.
2. Convert each coordinate $c_p$ of P as follows: $c_p''$=ToIPDomain($c_p,c_p'$), where $c_p' \epsilon_R R'$.
3. Compute Q''=kP'' where for each finite field operation steps A6-A12 of method A are used accordingly.
4. Convert Q'' to Q=kP by converting each coordinate $c_Q''$ of Q as follows: $c_Q$=FromIPDomain($c_Q''$).
5. Return Q if no fault was detected.

CRT-Based RSA-Cryptosystem Example

The CRT-based approach discussed above may be adapted as follows:
let ToIPDomain$_t$(x,y)=CRT$_{p,t}$(x,y) and
let ToIPDomain$_s$(x,y)=CRT$_{q,s}$(x,y) for two coprime values s and t.
Accordingly, FromIPDomain$_t$(x)=x MOD p and FromIPDomain$_s$(x)=x MOD q. A message M$\epsilon\{0,1\}$* may then be signed as follows:
1. $s_1$=ToIPDomain$_t$(H(M),$r_1$) where $r_1 \epsilon_R Z_t$
2. $s_2$=ToIPDomain$_s$(H(M),$r_2$) where $r_2 \epsilon_R Z_s$
3. $\sigma_1 = s_1^d$ MOD p·t where for each multiplication steps A6-A12 of Method A are used accordingly.
4. $\sigma_2 = s_2^d$ MOD q·s where for each multiplication steps A6-A12 of Method A are used accordingly.
5. $\sigma$=CRT$_{p,q}$(FromIPDomain$_t$($\sigma_1$),FromIPDomain$_s$($\sigma_2$))
6. Return $\sigma$ if no fault was detected.

Hence, a fault injected during one of the two exponentiations (step 3 or step 4) may be detected with the corresponding probability.

Elliptic Curve Group Countermeasures

A basic countermeasure may be to verify in- and output points of computations. Such verifications are referred to Point Verification (PV) and may ensure that only points are returned that lie on the curve. Unfortunately, there are other fault attack models which are not covered by PV. For instance, one could successfully by-pass the PV because this is only one check in long chain of computations.

An additional or alternative solution is to include Concurrent Error Detection which checks whether an invariant is still valid after a single operation. If the scalar multiplication used is the Montgomery Powering ladder, one invariant is the fact that an intermediate point of the current step of the scalar multiplication loop differs from the previous one in the basepoint's x-coordinate. The invariant may be checked at any point in time, but is usually quite costly, where the costs for a point operation may be roughly increased by 100% for the number of necessary Finite Field multiplications. In the efficient approach one could also perform a PV from time to time during the scalar multiplication. This may also be costly because it requires several further group operations for the check, i.e., it makes no sense to introduce such a check for each intermediate step but only at randomly chosen steps. Another approach may be to involve some kind of verification path in parallel to the main computation path which may be checked during and/or at the end of the computation or redundant coding with intermediate consistency checks, e.g., having integrity protection on field arithmetic level).

RSA Group Countermeasures

Research into a countermeasure against faults attacks on CRT-based RSA has resulted in a comparable running time to the described embodiments. However, the disadvantage of his approach may be that the integrity check is only done once at the end. If this check is skipped by an attack the scheme is broken. In contrast, the embodiments presented above have the advantage that if an intermediate check is skipped the fault may be detected in checks of subsequent operations.

The various exemplary embodiments may be employed in various devices and systems, for example, smart cards, security tokens, communication devices, wireless devices, computer nodes, network nodes, RFID chips, NFC chips, identity verification terminals, point of sale terminals, automatic teller machines, storage devices, etc. Further, the various exemplary embodiments may be implemented in computer software for secure communication across both public and private networks. Such computer software may include browsers or any other software that allows for communication across networks. Such embodiments may be used to calculate various cryptographic functions, for example, public key cryptography encryption, decryption, and key generation, hash functions, etc.

It should be apparent from the foregoing description that various exemplary embodiments may be implemented in hardware and/or firmware. Furthermore, various exemplary embodiments may be implemented as instructions stored on a non-transitory storage medium, which may be read and executed by at least one processor to perform the operations described in detail herein. A tangible machine-readable storage medium may include any mechanism for storing information in a form readable by a machine, such as a personal or laptop computer, tablet, a server, or other computing device. Further, special processors may be used to carry out the computations of the above described methods and may be included in these computing devices. Such processors may include signal processors, math coprocessors, specialized cryptographic processors, or other processors capable of implementing the cryptographic method described above. Such special cryptographic processors and other processors may be optimized to quickly and efficiently perform various calculations specific to the cryptographic methods by including specific functionality matched to the cryptographic functions to be calculated. Such special cryptographic processors may include a general processor that includes specific cryptographic processing capabilities that may be implemented in hardware, software, or a combination thereof. Thus, a tangible machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially rep-

We claim:

1. A method for integrity protected calculation of a cryptographic function on a cryptographic processor comprising:
   performing on a cryptographic processor an operation $c = a \circ b$ in a cryptographic function $f_{p,q}(x_1, x_2, \ldots, x_n)$ defined over a commutative ring R, wherein a and b are any one of $x_1, x_2, \ldots, x_n$ and p and q are prime such that $\bar{p}p \equiv 1$ (MOD q) and $\bar{q}q \equiv 1$ (MOD p);
   choosing a' and b' corresponding to a and b such that a' and b' are elements of a commutative ring R', with a modulus m that is coprime with p·q, wherein a' and b' are a cyclic redundancy check of a and b;
   computing $c' = a' \circ b'$;
   computing $a'' = CRT_{p,q}(a, a')$ and $b'' = CRT_{p,q}(b, b')$, where CRT is a Chinese Remainder Theorem defined as $CRT_{p,q}(a,b) = (a\,\bar{p}\,p + b\,\bar{q}\,q)$ MOD pq;
   computing $c'' = a'' \circ b''$;
   calculating a mapping of c″ into $R' = c''$ mod m; and
   determining if the mapping of c″ into R' equals c', and then indicating that no fault is detected,
   wherein if the mapping of c″ into R' equals c' then repeating the above steps to further calculate the cryptographic function $f_{p,q}(x_1, x_2, \ldots, x_n)$ for other values of a and b, otherwise indicate that the calculation of the cryptographic function $f_{p,q}(x_1, x_2, \ldots, x_n)$ is invalid.

2. The method of claim 1, wherein the cryptographic function is based upon a factoring problem.

3. The method of claim 1, wherein the cryptographic function is based upon a discrete logarithm problem.

4. The method of claim 1, wherein choosing a' and b' includes setting $a' = \alpha'$ and $b' = \alpha'$, where $\alpha'$ is a constant in R' and further comprising:
   computing $\alpha'' = CRT(0, \alpha')$, wherein computing c″ includes computing $c'' = a'' \circ b'' - \tilde{\alpha}$ where $\tilde{\alpha} = \alpha''$ if $\circ'' = +''$ and $\tilde{\alpha} = \alpha''(\alpha''-1)$ if $\circ'' = \cdot''$.

5. The method of claim 4, wherein if the mapping of c″ into R' equals $\alpha'$ then repeating the method of claim 1 to further calculate the cryptographic function $f_{p,q}(x_1, x_2, \ldots, x_n)$ for other values of a and b, otherwise indicate that the calculation of the cryptographic function $f_{p,q}(x_1, x_2, \ldots, x_n)$ is invalid.

6. A non-transitory storage medium encoded with instructions for performing an integrity protected calculation of a cryptographic function comprising:
   instructions for performing on a cryptographic processor an operation $c = a \circ b$ in a cryptographic function $f_{p,q}(x_1, x_2, \ldots, x_n)$ defined over a commutative ring R, wherein a and b are any one of $x_1, x_2, \ldots, x_n$ and p and q are prime such that $\bar{p}p \equiv 1$ (MOD q) and $\bar{q}q \equiv 1$ (MOD p);
   instructions for choosing a' and b' corresponding to a and b such that a' and b' are elements of a commutative ring R', with a modulus m that is coprime with p·q, wherein a' and b' are a cyclic redundancy check of a and b;
   instructions for computing $c' = a' \circ b'$;
   instructions for computing $a'' = CRT_{p,q}(a, a')$ and $b'' = CRT_{p,q}(b, b')$, where CRT is a Chinese Remainder Theorem defined as $CRT_{p,q}(a,b) = (a\,\bar{p}\,p + b\,\bar{q}\,q)$ MOD pq;
   instructions for computing $c'' = a'' \circ b''$;
   instructions for calculating a mapping of c″ into $R' = c''$ mod m; and
   instructions for determining if the mapping of c″ into R' equals c', and then indicating that no fault is detected,
   wherein if the mapping of c″ into R' equals c' then repeating the above instructions to further calculate the cryptographic function $f_{p,q}(x_1, x_2, \ldots, x_n)$ for other values of a and b, otherwise indicate that the calculation of the cryptographic function $f_{p,q}(x_1, x_2, \ldots, x_n)$ is invalid.

7. The non-transitory storage medium of claim 6, wherein the cryptographic function is based upon a factoring problem.

8. The non-transitory storage medium of claim 6, wherein the cryptographic function is based upon a discrete logarithm problem.

9. The non-transitory storage medium of claim 6, wherein choosing a' and b' includes setting $a' = \alpha'$ and $b' = \alpha'$, where $\alpha'$ is a constant in R' and further comprising:
   instructions for computing $\alpha'' = CRT(0, \alpha')$, wherein instructions for computing c″ includes computing $c'' = a'' \circ b'' - \tilde{\alpha}$ where $\tilde{\alpha} = \alpha''$ if $\circ'' = +''$ and $\tilde{\alpha} = \alpha''(\alpha''-1)$ if $\circ'' = \cdot''$.

10. The non-transitory storage medium of claim 9, wherein if the mapping of c″ into R' equals $\alpha'$ then repeating the method of claim 1 to further calculate the cryptographic function $f_{p,q}(x_1, x_2, \ldots, x_n)$ for other values of a and b, otherwise indicate that the calculation of the cryptographic function $f_{p,q}(x_1, x_2, \ldots, x_n)$ is invalid.

* * * * *